US009881036B2

(12) United States Patent
Cazemier et al.

(10) Patent No.: US 9,881,036 B2
(45) Date of Patent: Jan. 30, 2018

(54) AVOID DOUBLE COUNTING OF MAPPED DATABASE DATA

(71) Applicant: International Business Machines Corporation, Armonk, NY (US)

(72) Inventors: Hendrik Cazemier, Spencerville (CA); Celine Goyette, Pontiac (CA); Pascal D. Lacombe, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 14/556,386

(22) Filed: Dec. 1, 2014

(65) Prior Publication Data

US 2016/0154838 A1 Jun. 2, 2016

(51) Int. Cl.
*G06F 17/30* (2006.01)

(52) U.S. Cl.
CPC .. *G06F 17/30303* (2013.01); *G06F 17/30483* (2013.01); *G06F 17/30598* (2013.01)

(58) Field of Classification Search
CPC .......... G06F 17/30469; G06F 17/3053; G06F 17/30958; G06F 17/30303; G06F 17/30371; G06F 17/30466; G06F 17/30483; G06F 17/30598; G06F 17/30867
See application file for complete search history.

(56) References Cited

U.S. PATENT DOCUMENTS

| 7,296,040 | B2 | 11/2007 | Cazemier et al. |
| 7,546,312 | B1 * | 6/2009 | Xu ..................... G06F 17/30563 707/606 |
| 7,844,623 | B2 | 11/2010 | Dettinger et al. |
| 9,619,549 | B2 * | 4/2017 | Banerjee ........... G06F 17/30592 707/606 |

(Continued)

OTHER PUBLICATIONS

Peter Thanisch, Tapio Niemi, Marko Niinimaki, and Jyrki Nummenmaa—"Using the Entity-Attribute-Value Model for OLAP Cube Construction"—(2011) Using the Entity-Attribute-Value Model for OLAP Cube Construction. In: Grabis J., Kirikova M. (eds) Perspectives in Business Informatics Research. BIR 2011.—pp. 59-72.*

(Continued)

*Primary Examiner* — Anh Ly
(74) *Attorney, Agent, or Firm* — James H. Mayfield (57) ABSTRACT

As disclosed herein a method, executed by a computer, for avoiding double counting in the presence of many-to-many relationships in database data includes receiving a report definition from a data management system, detecting a bridge table defining many-to-many relationships between at least two datasets, generating a query plan with layered sub-queries, and executing the query plan including the layered sub-queries to provide query results corresponding to the report definition. A query plan with layered sub-queries may include instructions to join, partition, normalize, group, and summarize tabular data. Additionally, a conditional selection operation may be used to detect and (Continued)

eliminate duplicated data from a field specified in the report definition. The resulting query plan may be executed as a single query language. A computer program product and an apparatus corresponding to the described method are also disclosed herein.

10 Claims, 7 Drawing Sheets

(56) References Cited

U.S. PATENT DOCUMENTS

| | | | | |
|---|---|---|---|---|
| 2005/0039033 | A1* | 2/2005 | Meyers | G06F 17/30392 |
| | | | | 713/193 |
| 2005/0065756 | A1* | 3/2005 | Hanaman | G06F 17/30592 |
| | | | | 703/2 |
| 2005/0182785 | A1 | 8/2005 | Oswalt | |
| 2007/0061287 | A1* | 3/2007 | Le | G06F 17/30457 |
| | | | | 707/E17.003 |
| 2007/0208608 | A1* | 9/2007 | Amerasinghe | G06Q 10/063 |
| | | | | 705/7.11 |
| 2008/0033914 | A1* | 2/2008 | Cherniack | G06F 17/30457 |
| | | | | 707/E17.109 |
| 2008/0235231 | A1* | 9/2008 | Gass | G06F 21/6227 |
| | | | | 707/E17.005 |
| 2009/0299987 | A1* | 12/2009 | Willson | G06F 17/30563 |
| | | | | 707/E17.004 |
| 2009/0327347 | A1 | 12/2009 | Hoang et al. | |
| 2011/0078216 | A1 | 3/2011 | Healy et al. | |
| 2011/0131199 | A1* | 6/2011 | Simon | G06F 17/30463 |
| | | | | 707/714 |
| 2013/0031555 | A1* | 1/2013 | Tobin | G06F 9/4881 |
| | | | | 718/102 |
| 2013/0173528 | A1* | 7/2013 | Betawadkar-Norwood | |
| | | | | G06F 17/30451 |
| | | | | 707/E17.014 |
| 2013/0311509 | A1* | 11/2013 | Sorkin | G06F 17/30946 |
| | | | | 707/769 |
| 2014/0074801 | A1* | 3/2014 | Kacher | G06F 17/30303 |
| | | | | 707/692 |
| 2014/0095535 | A1 | 4/2014 | Deshmukh et al. | |
| 2016/0078064 | A1* | 3/2016 | Sassin | G06F 17/30292 |
| | | | | 707/E17.056 |

OTHER PUBLICATIONS

Pocut Viqarunnisa, Hira Laksmiwati, and Fazat Nur Azizah— "Generic Data Model Pattern for Data Warehouse"—2011 International Conference on Electrical Engineering and Informatics Jul. 17-19, 2011, Bandung, Indonesia—pp. 1-8.*

Hachicha, M. et al. "A Novel Query Based Approach for Addressing Summarizability Issues in XOLAP". The 18th International Conference on Management of Data (COMAD), Dec. 14-16, 2012 at Pune, India. Copyright 2012 Computer Society of India (CSI).

IBM, "IBM Cognos Fix Packs, Cognos BI 10.2.1. FP3", Jun. 20, 2014, <http://www-01.ibm.com/software/analytics/cognos/support/fixpacks.html>, Grace Period Disclosure.

Cazemier et al., "Avoid Double Counting of Mapped Database Data", U.S. Appl. No. 14/729,394, filed Jun. 3, 2015, pp. 1-29.

IBM Appendix P, list of IBM patents or patent applications treated as related, Jun. 3, 2015, pp. 1-2.

* cited by examiner

|       | Last Name       | Country   | Appraised Value |
|-------|-----------------|-----------|-----------------|
| 410a  | Adams           | Canada    | 100,000         |
|       | Adams - Summary |           | 100,000         |
| 410b  | Jones           | Canada    | 200,000         |
|       |                 | Argentina | 300,000         |
|       | Jones - Summary |           | 500,000         |
| 410c  | Smith           | Canada    | 200,000         |
|       |                 | Germany   | 400,000         |
|       | Smith - Summary |           | 600,000         |
|       | Total           |           | 1,000,000       |

|  | Owner ID | Last Name |
|---|---|---|
| 610 | O1 | Adams |
|  | O2 | Jones |
|  | O3 | Smith |

|  | Owner ID | Property ID |
|---|---|---|
| 620 | O1 | P1 |
|  | O2 | P2 |
|  | O2 | P3 |
|  | O3 | P2 |
|  | O3 | P4 |

|  | Property ID | Country | Appraised Value |
|---|---|---|---|
| 630 | P1 | Canada | 100,000 |
|  | P2 | Canada | 200,000 |
|  | P3 | Argentina | 300,000 |
|  | P4 | Germany | 400,000 |

FIG. 6A

| Last Name | Country | Appraised Value | Appraised Value by Name | Total Appraised Value |
|---|---|---|---|---|
| Adams | Canada | 100,000 | 100,000 | 100,000 |
| Jones | Canada | 200,000 | 200,000 | 200,000 |
| Jones | Argentina | 300,000 | 300,000 | 300,000 |
| Smith | Canada | 200,000 | 200,000 |  |
| Smith | Germany | 400,000 | 400,000 | 400,000 |

FIG. 6B

| Last Name | Country | Appraised Value | Appraised Value by Name | Total Appraised Value |
|---|---|---|---|---|
| Adams | Canada | 100,000 | 100,000 | 1,000,000 |
| Jones | Canada | 200,000 | 500,000 | 1,000,000 |
| Jones | Argentina | 300,000 | 500,000 | 1,000,000 |
| Smith | Canada | 200,000 | 600,000 | 1,000,000 |
| Smith | Germany | 400,000 | 600,000 | 1,000,000 |

AVOID DOUBLE COUNTING OF MAPPED DATABASE DATA

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:

(1) IBM Cognos Fix Packs, Cognos BI 10.2.1 FP3, Jun. 20, 2014 http://www-01.ibm.com/software/analytics/cognos/support/fixpacks.html

BACKGROUND OF THE INVENTION

The present invention relates generally to the field of analytics reporting, and more particularly to accumulation of data in the presence of bridge tables and many-to-many relationships in database data.

Analytics may be defined as a method of logical analysis, and may be thought of as the discovery and communication of meaningful patterns in data. Much of the communication corresponding to analytical discoveries is captured and disseminated via reports generated during and after analysis of database data. It is imperative that the information in the reports be accurate. Inaccuracies of accumulated data in the generated reports may lead to incorrect assumptions and projections, and may ultimately contribute to economic, financial, or industrial issues. For example, a local government may be estimating property tax revenue for the yearly budget, and a report accidentally includes taxes paid for properties multiple times when a property has multiple owners; thus, inflating the expected tax revenue for the year. As a result, the government may end the year in a deficit.

SUMMARY

As disclosed herein a method, executed by a computer, for avoiding double counting in the presence of many-to-many relationships in database data includes receiving a report definition from a data management system, detecting a bridge table defining many-to-many relationships between at least two datasets, generating a query plan with layered sub-queries, and executing the query plan including the layered sub-queries to provide query results corresponding to the report definition. A query plan with layered sub-queries may include instructions to join, partition, normalize, group, and summarize tabular data. The bridge table may be a fact-less fact table. Additionally, a conditional selection operation may be used to detect and eliminate duplicated data from a field specified in the report definition. The resulting query plan may be executed as a single query language statement and may produce a result that does not include a direct projection of a unique identifier of a dimension table or the bridge table. A computer program product and an apparatus corresponding to the described method are also disclosed herein.

DETAILED DESCRIPTION

In this age of information, with the current popularity of analytics, the gathering, storing, and analyzing of information is a common activity. The information may be stored in databases and later analyzed and used as input for report generation. When using data stored in databases to generate reports, consideration must be given to the possibility of double counting data when generating accumulations. It has been observed that currently available solutions for avoiding double counting are manual techniques that may be tedious and error prone. The embodiments disclosed herein provide an automated method for avoiding double counting during aggregation in the presence of many-to-many relationships in database data.

Prior to being useful, the data in a database may have to be presented as a data model. In one embodiment, preparing the data for access and use by a data management system may include creating a database object model by importing the database schema into a modeling tool. The modeling tool may produce objects, referred to as query subjects, which are representations of database tables upon which query actions take place. The modeling tool may be used to design joins across query subjects, specify additional properties on a query subject, define query filters, and the like. Additionally, the modeling tool may also be used to identify a query subject as a bridge table.

Figure 1:
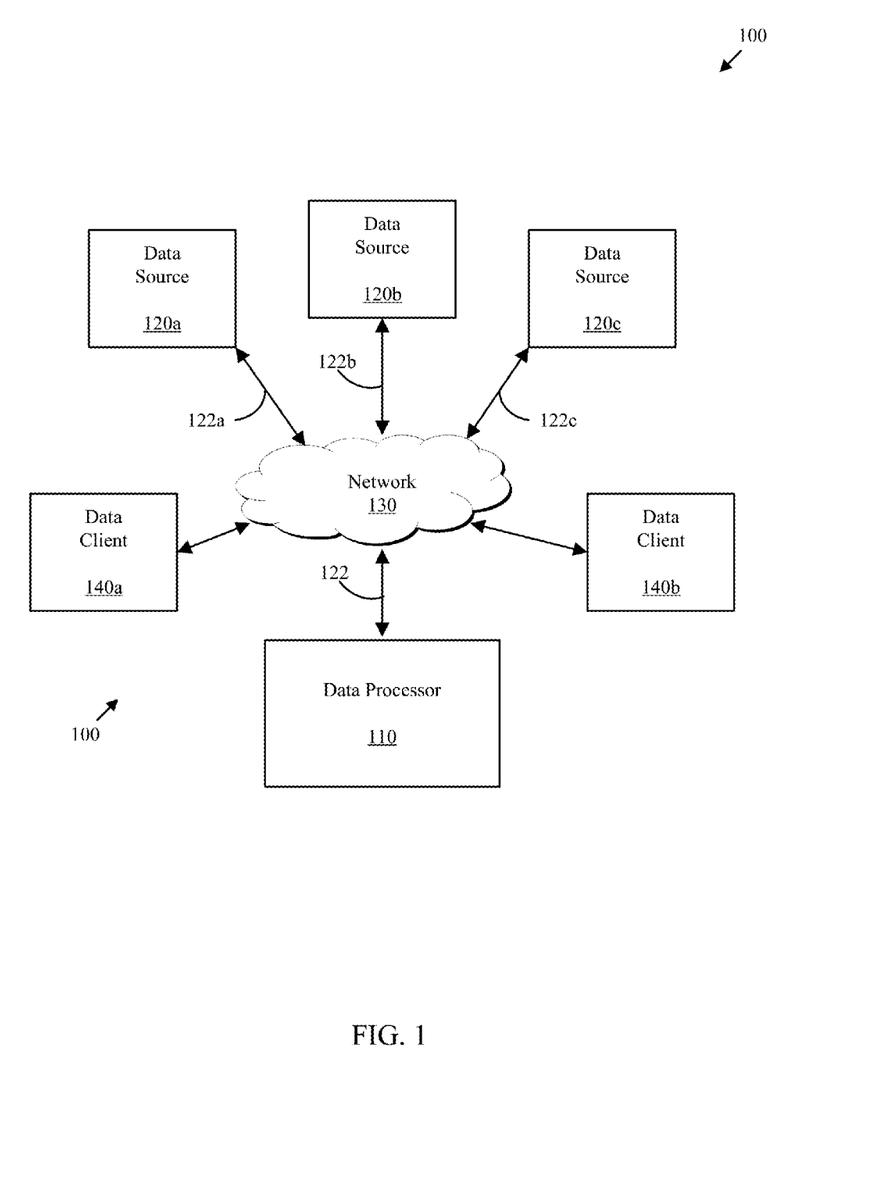
FIG. 1 is a functional block diagram of one embodiment of a data processing environment in which at least some of the embodiments disclosed herein may be deployed.

FIG. 1 is a functional block diagram of one embodiment of a data processing environment 100. As depicted, the data processing environment 100 includes a data processor 110, one or more data sources 120 (e.g., data sources 120a, 120b, and 120c), a network 130, and one or more data clients 140 (e.g., data clients 140a and 140b). The data processing environment 100 is one example of an environment in which at least some of the embodiments disclosed herein may be deployed.

The data processor 110 processes data provided by, or retrieved from, the data sources 120. The data sources 120 may be accessible to the data processor 110 via the network 130. One or more data clients 140 may also be connected to the data processor 110 via the network 130. In some embodiments the data sources 120 are also data clients 140.

Data 122, provided by the data sources 120, may be data stored in a database residing on a data source 120. The data may be represented in the database by rows in fact tables, dimension tables, and the like. Data retrieved from a database may require accessing individual database tables. Related data in separate tables may be referenced using relationships and cardinality rules. For example, the data records that comprise the data 122 (e.g. data source 122a, 122b and 122c) may have been retrieved from separate tables connected via various relationships. The relationships may have been of various cardinality, such as one-to-one, one-to-many, many-to-many, and the like.

The data stored in the database may be represented as a data model created by a data modeling tool and stored on the data sources 120. A data model may be referenced by a data management system when preparing a report for generation, while the actual database may be referenced when producing the report. Reports generated using data stored in databases may provide erroneous results due to double counting.

Figure 7:
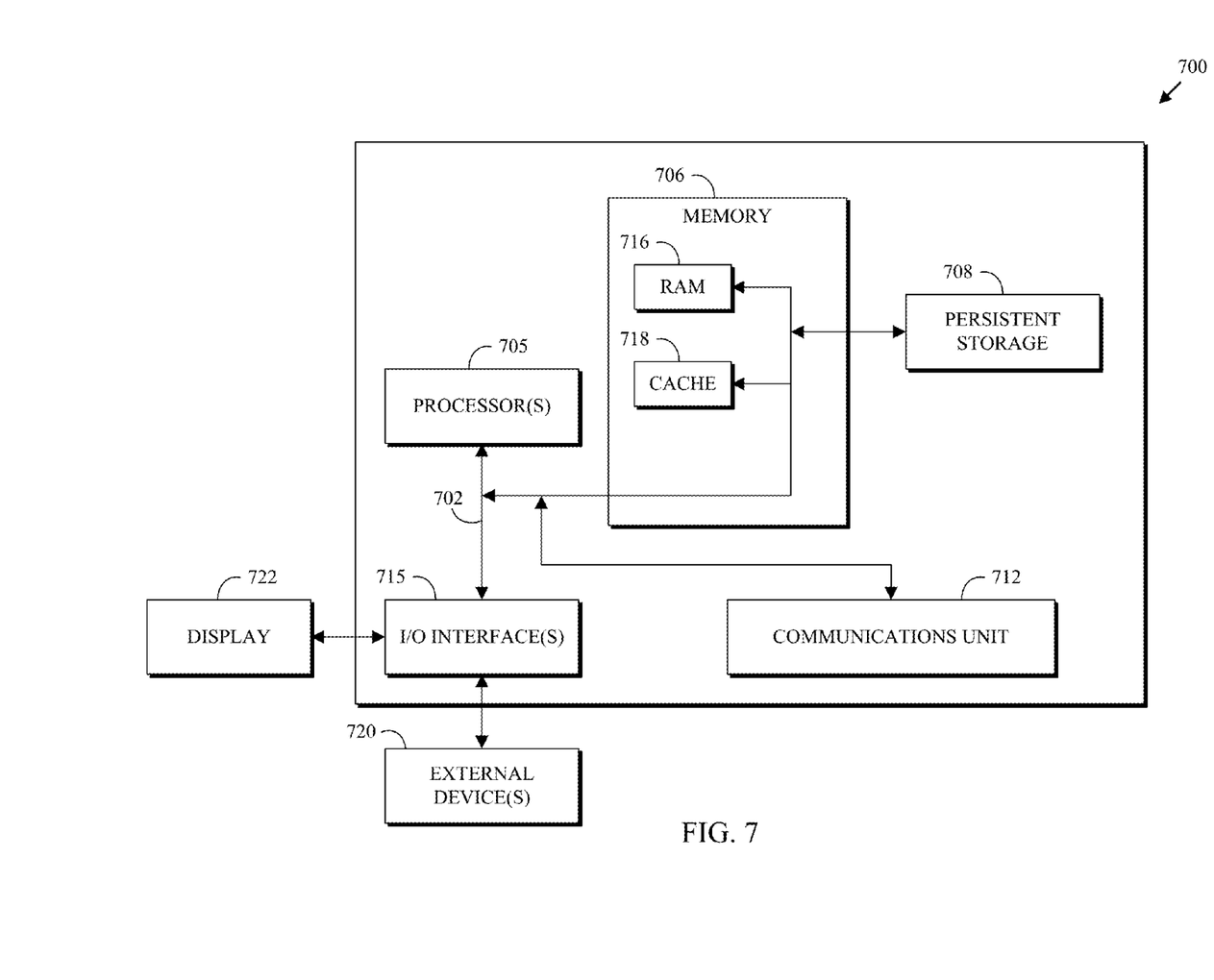
FIG. 7 is a block diagram depicting various components of one embodiment of a computer suitable for executing the methods disclosed herein, in accordance with an embodiment of the present invention.

It should be noted that the data processor 110 may include internal and external hardware components, as depicted and described in further detail with respect to FIG. 7. Furthermore, the network 130 can be any combination of connections and protocols that will support communications between the data processor 110, the data sources 120, and the data clients (i.e., data consumers) 140. For example, the network 130 can be a local area network (LAN), a wide area network (WAN) such as the Internet, or a combination of the two, and can include wired, wireless, or fiber optic connections.

Figure 2:
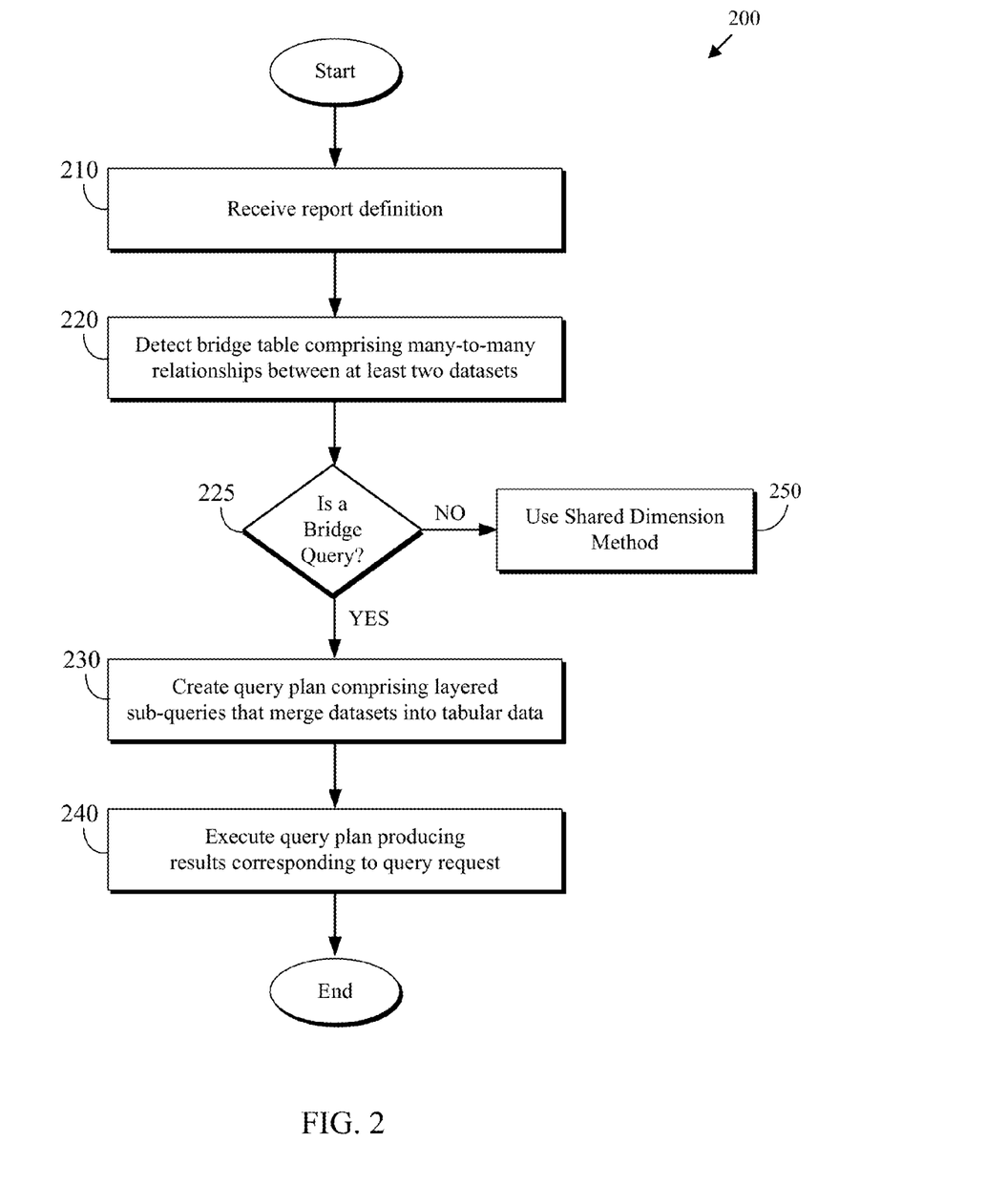
FIG. 2 is a flow chart depicting one embodiment of a data retrieval method.

FIG. 2 is a flow chart depicting one embodiment of a data retrieval method 200. As depicted, the data retrieval method 200 includes receiving (210) a report definition, detecting (220) a bridge table, determining (225) if the request can be processed as a bridge query, creating (230) a query plan, executing (240) the query plan, and using (250) a shared dimension method. The data retrieval method 200 enables generating reports that are free of double counted results.

Receiving (210) a report definition may include receiving a request to obtain, from a database, specific information required to produce a report. The database may be IBM DB2, IBM Netezza, Oracle DB, Apache Hadoop or any other known database type or format. The report definition may have been initiated from a data management system such as IBM Cognos, Qlik, Tableau or SAS. In some embodiments, the report definition includes references to various tables including dimension tables, fact tables, and bridge tables, as well as indicating how the data should be grouped and sorted. In other embodiments, the report definition includes references to only dimension tables and fact tables.

Detecting (220) a bridge table may include checking each fact table, referenced by the report definition, to determine if the fact table has also been identified as a bridge table. A fact table may be identified as a bridge table, in the data model, by a modeler. A table identified as a bridge table defines many-to-many relationships to at least two datasets. In some embodiments, a bridge table is a fact-less fact table (i.e., a fact table with no fact data). In other embodiments, a bridge table is a fact table that includes fact data, however, the fact data may or may not be included in the report results.

Determining (225) if the request can be processed as a bridge query may include determining if a bridge table exists that connects the appropriate dimension tables and fact tables to satisfy the requirements of the report definition. If the request can be processed as a bridge query, the method 200 proceeds to use the bridge mapping method 230. Otherwise, the method proceeds to the use shared dimension method 250.

Creating (230) a query plan may include automatically creating layered sub-queries to obtain data from the database. Additionally, the layered sub-queries may also organize, sort, and accumulate the sub-query results in a format appropriate to satisfy the requirements corresponding to the report definition. In some embodiments, the layered sub-queries are merged into a single query language statement. In other embodiments, the sub-queries are presented as individual autonomous query commands. The layered sub-queries may be run against the at least two datasets referenced by the bridge table. Alternatively, additional tables may be included in the layered sub-queries.

Executing (240) the query plan may include converting the query plan to a database query language capable of performing the actions identified in the query plan. The database query language may be SQL, SPARQL, JAQL, XML, JSON or the like. In some embodiments, the query plan is complete and can be directly converted to executable database query statements. In other embodiments, the query plan includes variable fields that are to be filled in at the time the query plan is converted to executable database query language. The variables may be references to databases, tables, table columns, and the like. Once the query plan has been converted to executable database query statements, the resulting query may be executed against the database, producing query results corresponding to the report definition received from a database management system.

Using (250) a shared dimension method may include processing the request using processes familiar to those with skill in the art. In one example, a report shows three columns: a product name, a sold quantity and a returned quantity. The report is produced using a shared dimension table containing the product name, and two fact tables that include the products sold and returned products. In one embodiment, each quantity is aligned with respect to each unique value of the shared dimension; i.e., for each product the total number of items sold and the total number of items returned are presented.

Figure 3:
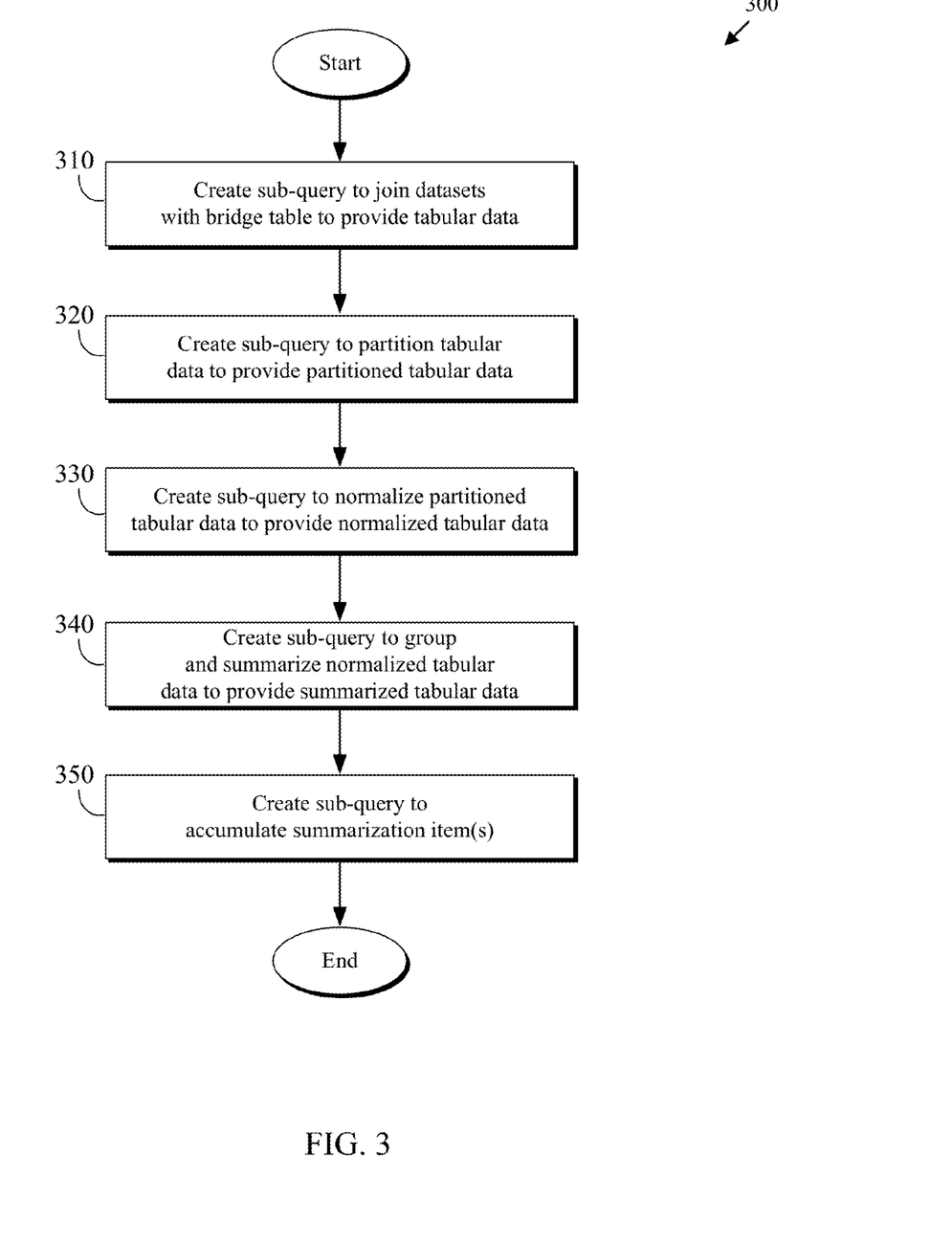
FIG. 3 is a flow chart depicting one embodiment of a query plan creation method.

FIG. 3 is a flow chart depicting one embodiment of a query plan creation method 300. As depicted, the query plan creation method 300 includes automatically creating sub-queries for: joining (310) datasets with a bridge table, partitioning (320) tabular data, normalizing (330) partitioned tabular data, grouping and summarizing (340) normalized tabular data, and accumulating (350) summarization items. The query plan creation method 300 may enable the planning and creation of multiple layered sub-queries (i.e., datasets) that, when executed, will produce the query results required to satisfy the requirements of the report definition.

Creating a sub-query for joining (310) datasets with a bridge table may include creating a sub-query corresponding to the bridge table and a sub-query corresponding to each side of the bridge. Each individual sub-query may also be referred to as a dataset. In some embodiments, the sub-query performs aggregation on fact items referenced within the sub-query and subsequently groups the results according to non-fact items and unique identifiers from the bridge relationship. In other embodiments, the sub-queries are joined in accordance with the relationships corresponding to unique identifiers associated with the bridge data. The joined sub-queries may result in tabular data to be used as input to the partitioning (320) operation.

Creating a sub-query for partitioning (320) tabular data may include generating a query statement that creates partitioned tabular data with individual columns corresponding to a field specified in the report definition that requires accumulation. In some embodiments the dataset results are divided into partitions, such that each accumulation field specified in the report definition will be represented in the partitioned tabular data by a unique column. The columns representing data to be accumulated may be populated with values from the fact tables. In other embodiments the columns representing data to be accumulated are populated with values from a dimension table. Each accumulation partition may be defined by the accumulation context and the relationship of the accumulation's table with the bridge. The partitioned tabular data may be used as input for the sub-query generated in operation 330.

Creating a sub-query for normalizing (330) partitioned tabular data may include a conditional selection operation to provide normalized tabular data. The conditional selection operation may be used to detect and eliminate duplicated values within each column representing data to be accumulated. The conditional selection operation may comprise selecting a single value from at least two duplicated rows and using a marker value to replace the duplicated value in the remainder of the at least two duplicated rows. In some embodiments, the conditional selection operation (e.g., the SQL case/when row number logic) uses a null as the marker value when replacing duplicate values. In other embodiments, the conditional selection operation uses a zero or some other value as the marker value when replacing duplicate values. The normalized tabular data may be used as input to the summarizing sub-query generated in operation 340.

Creating a sub-query for grouping and summarizing (340) normalized tabular data may include combining and accumulating any rows in the in the normalized tabular data comprising data that may have been normalized at a lower level of granularity than is required to satisfy the requirements of the report definition. In some embodiments, after normalization, the normalized tabular data includes two or more rows that will be represented as a single row in the report definition. The normalized rows do not include duplicated data, but do include information corresponding to a single line in the resulting report. The two or more rows will be grouped (i.e., merged) to a single row, and any cells including multiple values will be summarized (i.e., accumulated) providing summarized tabular data which may be used as input for the sub-query generated in operation 350.

Creating a sub-query for accumulating (350) summarization items may include populating the accumulations in the final result set. Summarization items (e.g., subtotals and totals) identified in the report definition may be independently accumulated from the summarized tabular data. The data for each summarization item may be represented in a column in the summarized tabular data. In some embodiments, a summarization item is calculated by accumulating all contents of a single column in the summarized tabular data. In other embodiments, a summarization item is calculated by accumulating values corresponding to selected values from another column in the summarized tabular data.

Figure 4:
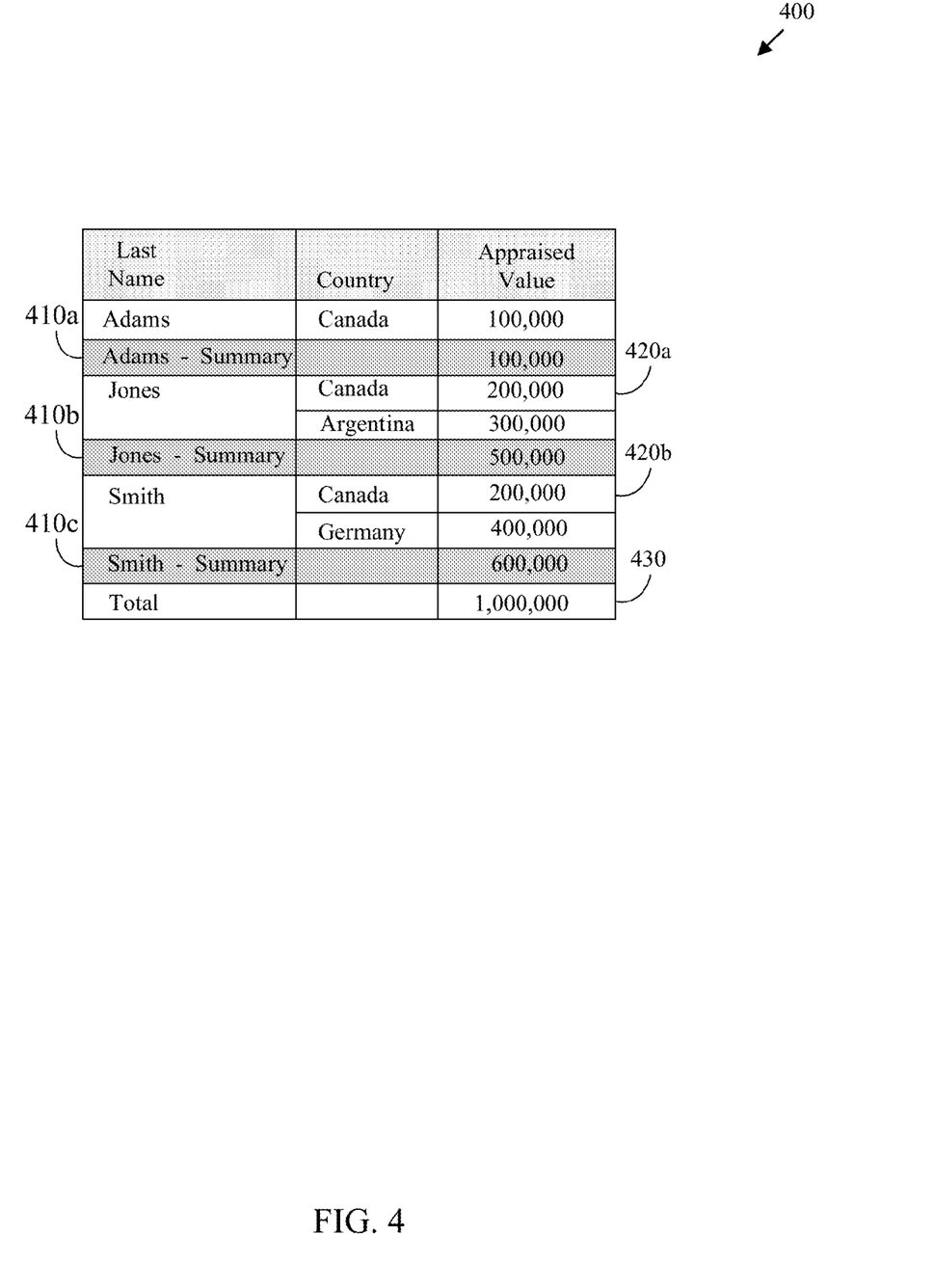
FIG. 4 is a table illustrating a specific example of a report produced using a bridge table and many-to-many relationships in database data.

FIG. 4 is a table illustrating a specific example of a report 400 that is produced using a bridge table defining many-to-many relationships. The report 400 is one embodiment of a report that represents appraised property values by owner's last name and county in which the property is located. The report 400 includes of a total line 430 which is an accumulation of all appraised values, without double counting the appraised value for any properties that are listed two or more times. In the report 400, lines 420*a* and 420*b* correspond to the same property and the appraised value for the property is not double counted in the total line 430.

Figure 5:
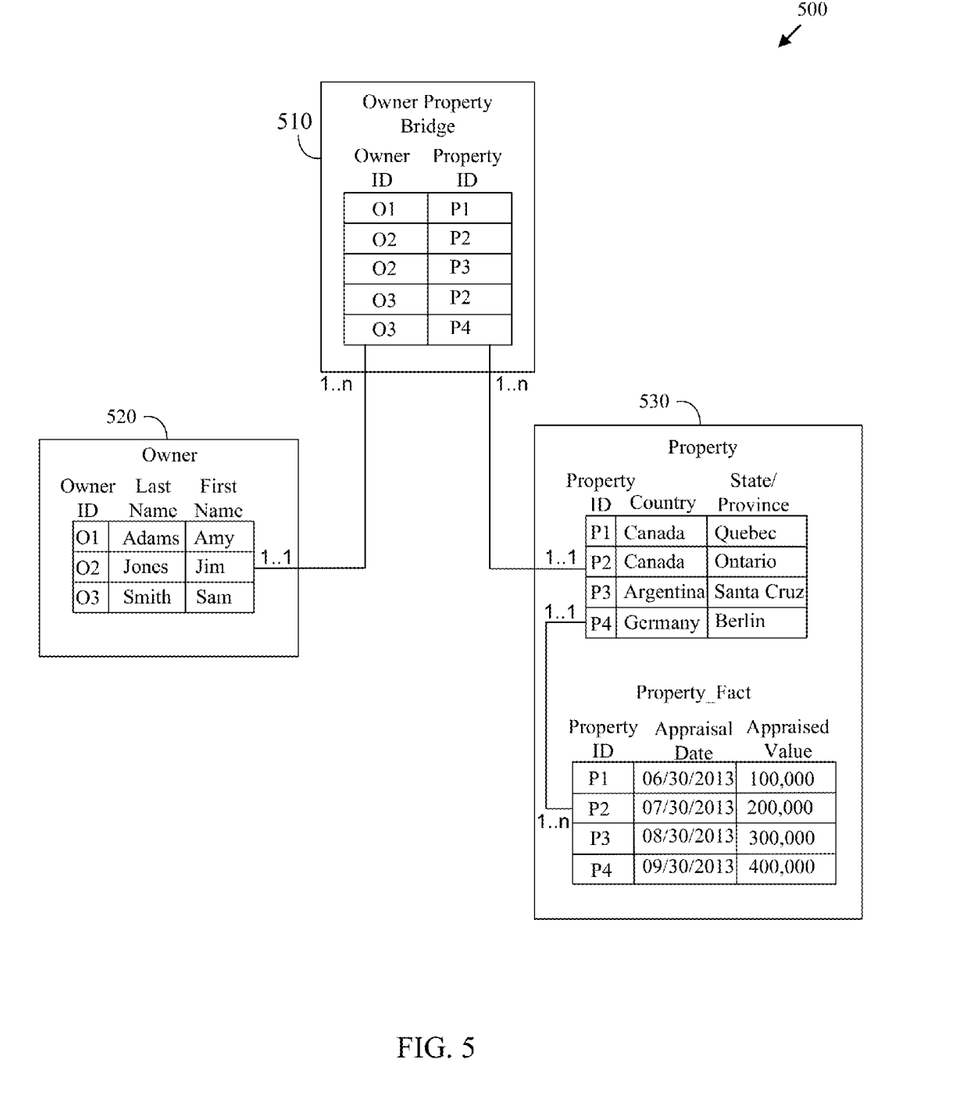
FIG. 5 is a set of tables illustrating a specific example of a bridge table and connected tables used to provide the data presented in FIG. 4.

FIG. 5 is a set of tables illustrating a specific example of a bridge table and connected tables 500 used to provide the data presented in FIG. 4. As depicted, the bridge table 510 may be a fact-less fact table that has been identified as a bridge table for the owner data 520 and the property data 530. The bridge table 510 comprises two columns of data, one includes unique identifiers corresponding to individual owners and the second includes unique identifiers corresponding to individual properties. Each row in the bridge table 500 may correspond to an owner and property combination, where each owner and each property may be present multiple times; that is, each owner may own one or more properties, and each property may be owned by one or more owners.

Figure 6A:
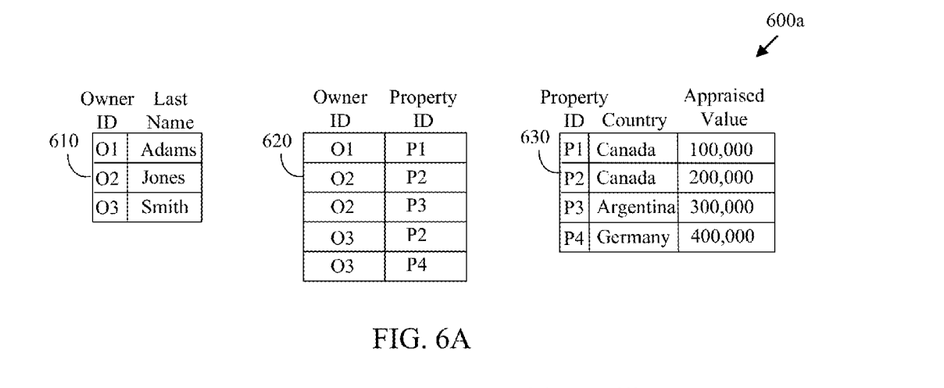
FIG. 6A is a set of tables illustrating a specific example of datasets during the query process used to provide the data presented in FIG. 4.

FIG. 6A is a set of tables illustrating a specific example of datasets 600*a* used during a query process to provide the data presented in FIG. 4. As depicted, the datasets 600*a* include owner sub-query results 610, bridge sub-query results 620, and property sub-query results 630. Each dataset may include data required to satisfy the report definition. In some embodiments, the depicted datasets may be produced as a tangible result during the execution of a query plan. In other embodiments, the depicted results may only be an intermediate step in a query plan, and are not a tangible result.

Figure 6B:
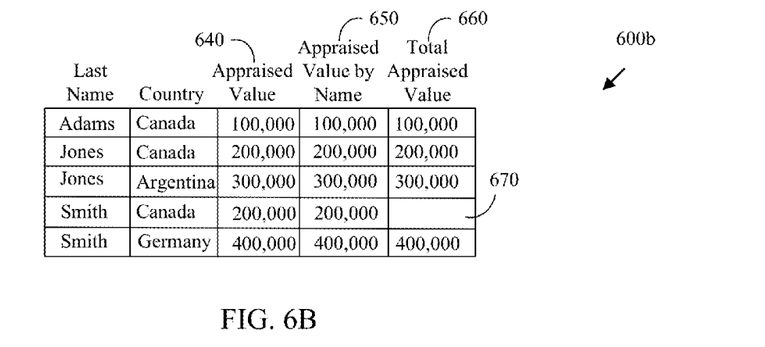
FIG. 6B is a table illustrating a specific example of data after joining, partitioning, normalizing, and grouping datasets.

FIG. 6B is a table illustrating a specific example of a data table 600*b* after joining, partitioning, normalizing, and grouping operations. The depicted data table 600*b* represents the datasets from FIG. 6A after the datasets have been joined, partitioned, normalized, and grouped. The data table 600*b* may include one or more columns representing the detail (i.e., non-accumulated) values specified in the report definition (e.g., appraised value 640). The table 600*b* may also include a column for each field specified in the report definition that represents an accumulation (e.g., appraised value by name 650 and total appraised value 660).

The data 600*b* may have cells with a marked value 670 representing a location that previously included a duplicated value. In the depicted example, the marked value 670 is a null value. Other values such as a zero value may also be used to indicate the location of a duplicated value. Additionally, the resulting tabular data does not include a direct projection of a unique identifier of a dimension table or the bridge table, essentially segregating the result set from the actual database tables.

Figure 6C:
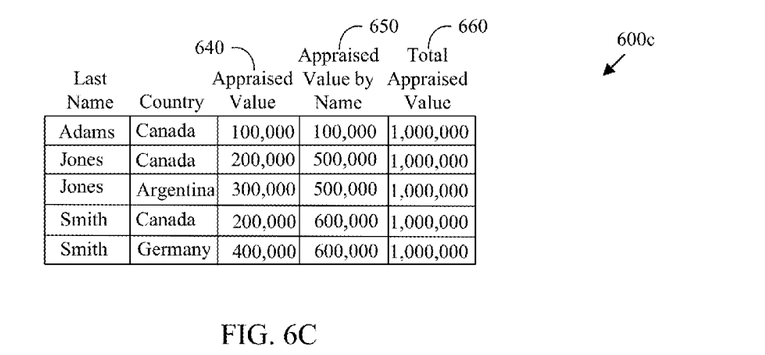
FIG. 6C is a table illustrating a specific example of the resulting data after a query plan has completed execution, providing the data presented in FIG. 4.

FIG. 6C is a table illustrating a specific example of a result set 600*c* after a query plan has completed execution. The result set 600*c* may correspond to the data presented in FIG. 4. The result set 600*c* may have one or more columns representing the detail values specified in the report definition (e.g., appraised value 640). The result set 600*c* may also have a column for each field specified in the report definition corresponding to an accumulation (e.g., appraised value by name 650 and total appraised value 660).

The column representing appraised value 640 assures the correct detail values corresponding to the report definition are available. The column representing appraised value by name 650 has been updated to include totals (e.g., subtotals) for appraised values accumulated by last name (e.g., both Jones rows include the subtotal 500,000). The column representing total appraised value 660 has been updated to include the total appraised value in each cell. In some embodiments, no further aggregation is required because the report renderer will only access one cell value when preparing the report. In other embodiments, further aggregation is required to present a single sub-total or total to the report renderer.

FIG. 7 is a block diagram depicting various components of one embodiment of a computer suitable for executing the methods disclosed herein, in accordance with an embodiment of the present invention. The computer 700 may be one embodiment of the data processor 110 depicted in FIG. 1. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 705, memory 706, persistent storage 708, communications unit 712, and input/output (I/O) interface(s) 715. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 716 and cache memory 718. In general, memory 706 can include any suitable volatile or non-volatile computer readable storage media.

One or more programs may be stored in persistent storage 708 for execution by one or more of the respective computer processors 705 via one or more memories of memory 706. The persistent storage 708 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 715 allows for input and output of data with other devices that may be connected to computer 700. For example, I/O interface 715 may provide a connection to external devices 720 such as a keyboard, keypad, a touch screen, and/or some other suitable input device. External devices 720 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 708 via I/O interface(s) 715. I/O interface(s) 715 also connect to a display 722. Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for avoiding double counting of mapped database data, the computer program product comprising:
    one or more computer readable storage media and program instructions stored on the one or more computer readable storage media, the program instructions comprising instructions to:
    receive a report definition from a data management system, wherein the report definition comprises a request to obtain information from at least two datasets, and wherein the report definition specifies a field in the at least two datasets for deduplication;
    detect a fact-less fact table defining many-to-many relationships between at least two datasets;
    generate automatically, a query plan with layered sub-queries against the at least two datasets, wherein the query plan includes instructions to:
        join the at least two datasets with the fact-less fact table to provide tabular data,
        partition the tabular data using the fact-less fact table to provide partitioned tabular data,
        normalize the partitioned tabular data using a conditional selection operation to provide normalized tabular data, wherein the conditional selection operation removes duplicates in the field specified by the report definition, and
        group and summarize the normalized tabular data to provide summarized tabular data; and
    execute the query plan comprising the layered sub-queries to provide query results corresponding to the report definition.

2. The computer program product of claim 1, wherein the conditional selection operation comprises selecting a single value from at least two duplicated rows in the partitioned tabular data and selecting a marker value for other rows of the at least two duplicated rows in the partitioned tabular data.

3. The computer program product of claim 1, wherein the tabular data does not include a direct projection of a unique identifier of a dimension table or the bridge table.

4. The computer program product of claim 1, wherein the program instructions comprise instructions to independently accumulate a summarization item by aggregating a column in the normalized tabular data.

5. The computer program product of claim 1, wherein the query plan is a single query language statement.

6. A computer system for avoiding double counting of mapped database data, the computer system comprising:
    one or more computer processors;
    one or more computer readable storage media;
    program instructions stored on the computer readable storage media for execution by at least one of the computer processors, the program instructions comprising instructions to:
    receive a report definition from a data management system, wherein the report definition comprises a request to obtain information from at least two datasets, and wherein the report definition specifies a field in the at least two datasets for deduplication;
    detect a fact-less fact table defining many-to-many relationships between at least two datasets;
    generate automatically, a query plan with layered sub-queries against the at least two datasets, wherein the query plan includes instructions to:

join the at least two datasets with the fact-less fact table to provide tabular data, partition the tabular data using the fact-less fact table to provide partitioned tabular data, normalize the partitioned tabular data using a conditional selection operation to provide normalized tabular data, wherein the conditional selection operation removes duplicates in the field specified by the report definition, and group and summarize the normalized tabular data to provide summarized tabular data; and execute the query plan comprising the layered sub-queries to provide query results corresponding to the report definition.

7. The computer system of claim 6, wherein the conditional selection operation comprises selecting a single value from at least two duplicated rows in the partitioned tabular data and selecting a marker value for other rows of the at least two duplicated rows in the partitioned tabular data.

8. The computer system of claim 6, wherein the tabular data does not include a direct projection of a unique identifier of a dimension table or the bridge table.

9. The computer system of claim 6, wherein the program instructions comprise instructions to independently accumulate a summarization item by aggregating a column in the normalized tabular data.

10. The computer system of claim 6, wherein the query plan is a single query language statement.

* * * * *